United States Patent
LaRiviere

[19]

[11] Patent Number: 5,992,870
[45] Date of Patent: *Nov. 30, 1999

[54] LOW RIDER KIT FOR A BICYCLE EMPLOYING A RIGID FORK

[76] Inventor: Alexander W. LaRiviere, P.O. Box 230, San Jose, Calif. 95103-0230

[*] Notice: This patent is subject to a terminal disclaimer.

[21] Appl. No.: 09/006,465

[22] Filed: Jan. 13, 1998

Related U.S. Application Data

[63] Continuation of application No. 08/569,050, Dec. 7, 1995, abandoned.

[51] Int. Cl.$^6$ ....................................................... B62K 1/00
[52] U.S. Cl. ............................................ 280/276; 280/280
[58] Field of Search .................................. 280/276, 279, 280/280, 283

[56] References Cited

U.S. PATENT DOCUMENTS

| | | | |
|---|---|---|---|
| D. 170,610 | 10/1953 | Sebel | D34/15 |
| 484,857 | 10/1892 | Kempe | 280/279 |
| 1,387,215 | 8/1921 | Wagner | 280/279 |
| 1,500,480 | 7/1924 | Zichman . | |
| 1,995,796 | 3/1935 | Clark | 208/101 |
| 2,160,034 | 5/1939 | Schwinn | 280/279 |
| 2,298,494 | 10/1942 | Manton | 280/276 |
| 2,330,892 | 10/1943 | Horstman | 280/276 |
| 2,513,496 | 7/1950 | Kranz | 280/289 |
| 2,550,876 | 5/1951 | Spencer | 280/276 |
| 2,590,050 | 3/1952 | Smith | 280/276 |
| 2,752,167 | 6/1956 | Propst et al. | 280/276 |
| 2,932,530 | 4/1960 | Chapman et al. | 280/276 |
| 2,968,493 | 1/1961 | Douglas | 280/280 |
| 3,208,767 | 9/1965 | Moulton | 280/276 |
| 3,439,926 | 4/1969 | Bayard . | |
| 3,507,516 | 4/1970 | Fritz | 280/279 |
| 3,643,974 | 2/1972 | Peate | 280/278 |
| 3,694,004 | 9/1972 | Siebers | 280/277 |
| 3,770,295 | 11/1973 | Sword | 280/229 |
| 3,807,761 | 4/1974 | Brilando et al. | 280/279 |
| 3,894,751 | 7/1975 | Fuhrman et al. | 280/279 |
| 4,037,855 | 7/1977 | Smith | 280/276 |
| 4,103,922 | 8/1978 | Brilando | 280/279 |
| 4,121,850 | 10/1978 | Ross | 280/279 |
| 4,162,797 | 7/1979 | McBride | 280/275 |
| 4,480,848 | 11/1984 | Georgiev | 280/281 |
| 4,565,383 | 1/1986 | Isaac | 280/276 |
| 4,711,459 | 12/1987 | Liu | 280/279 |
| 5,058,913 | 10/1991 | La Riviere et al. | 280/281.1 |
| 5,165,712 | 11/1992 | Fuller | 280/277 |
| 5,314,207 | 5/1994 | Camfield et al. | 280/828 |
| 5,813,685 | 9/1998 | LaRiviere | 280/279 |

FOREIGN PATENT DOCUMENTS 671164  2/1939  Germany .

*Primary Examiner*—Lanna Mai
*Assistant Examiner*—Jeff Restifo
*Attorney, Agent, or Firm*—LaRiviere, Grubman & Payne, LLP

[57] ABSTRACT

A straight bifurcated rigid bicycle fork is bent to produce a forward curve in the furcations or arms of the rigid fork. The curve has a bending radius of substantially six inches, and the angle between the arms and the main body of the rigid fork is less than a right angle. Typically, the angle of bend is on the order of substantially seventy-five degrees. When mounted on a bicycle, the curved rigid fork causes the front wheel to extend forward in front of the bicycle, and gives the bicycle a longer, lower look, thereby emulating what is known as a "low rider." When a helical spring and struts are added to the rigid curved fork, it emulates a spring-action low rider fork.

2 Claims, 13 Drawing Sheets

LOW RIDER KIT FOR A BICYCLE EMPLOYING A RIGID FORK

TECHNICAL FIELD

This is a continuation of my prior copending application Ser. No. 08/569,050, filed Dec. 7, 1995.

CROSS-REFERENCE TO RELATED APPLICATIONS

This application is related to patent application Ser. No. 08/045,747, filed Apr. 4, 1993.

BACKGROUND OF THE INVENTION

The present invention relates to bicycles and, more particularly, to a kit for safely converting a standard bicycle to a customized low rider style bicycle.

It is present practice to modify standard bicycles to a stylistic form referred to as "low riders". Shows are held to display these customized bicycles, and competitions are held to judge them and award trophies and prizes. News of such events and pictures of the bicycles are published in magazines such as Orlie's Lowriding Magazine, P. O. Box 44338 Rio Rancho, Rio Rancho, N. Mex. 87174; and in Low Rider Magazine, Park Avenue Publishing, Inc., P. O. Box 648, Walnut, Calif. 91788. These magazines represent the known published prior art in this field.

Over the past several years, the demand for low riders has increased substantially. The consumers range from young children to adults, and are not limited to one economic or ethnic group. Making a low rider involves giving the bicycle a longer and lower look. A low rider bicycle may comprise some or all of the following components: a cantilever frame, a specially bent fork, chrome mirrors, white-wall tires, chrome pedals, chrome chain, chrome chainguard, chrome fenders, high-rise handlebars, chrome "sissy-bar", chrome wheels, and banana seats. In addition, there could be other modifications such as using a smaller wheel on the front or on the rear, gold plating various parts, molding surfaces using a plastic material such as that known as "BONDO," or the like, painting the tank section, using painted hubcaps, and using special paints and upholstery.

Of all the foregoing components that may be employed in making a low rider bicycle, the key component is the fork. It is the fork that principally contributes the longer and lower look that defines a low rider. Heretofore, there has been no low rider fork on the market, so those who desire to build a low rider are forced to make their own low rider fork. These customizers are buying standard forks, or using the original forks and bending them. This usually causes fatigue of the fork, eventually causing it to collapse. At the minimum, fatigue of the fork can cause the pedals to drag on the ground.

Frequently, the bicycles are modified by inexperienced persons who do not understand safety principles, or who are willing to take chances. The low rider bicycles are made not only for show, but also to be ridden. If the modifications are incorrectly done, the pedals of a low rider bicycle may hit the street when the bicycle is being ridden, causing the bicycle to overturn. In this way, a serious accident may result, and the bicycle rider may be seriously injured. This type of hazard is caused by modifying the structure of the bicycle in such a way as to provide a low ground clearance between the bottom bracket and the street.

Another hazard is damaging the structural integrity of the bicycle. Sometimes inexperienced persons will bend the front fork using heat which softens the fork and leads to collapse when the bicycle is being ridden. At other times, the fork will be bent in such a way as to produce a kink at the bend. These kinks can also lead to collapse, thereby causing an accident.

This is a problem that actually exists. Investigations of bicycle accidents in connection with litigation have shown that incorrect modification of stock bicycle forks can be irresponsible and dangerous. Youngsters that ride incorrectly modified bicycles are literally taking their life in their hands. Accordingly, there is a need for a low rider kit for a bicycle that makes the low rider safe and rideable.

DISCLOSURE OF INVENTION

In accordance with one aspect of the present invention, there is provided a modification kit that includes a special rigid front fork for modifying a stock bicycle into a low rider. The features of this rigid front fork are that it is safe, it does not damage the structural integrity of the bicycle, and it does not damage the steerability of the bicycle. The rigid fork of the present invention gives the low rider look while eliminating the need to use heat for bending, eliminating the need for a separate safety washer for the safety dropout, and it is made of stronger materials, eliminating the need for a reinforcing strut to support the forward curvature of the fork. In addition, the rigid fork of the present invention is inexpensive in contrast with other customizing forks; it projects the front wheel out in front of the bicycle; and it is already chrome plated. The rigid fork of the present invention gives the illusion of a low rider, but the bicycle frame is not actually lowered to bring it closer to the street. The present invention also comprehends the method of making the rigid low rider fork used in the modification kit.

Typically, a rigid low rider fork in accordance with the invention is made from a generally straight chrome-plated standard long fork for a standard bicycle. Then, the straight fork is bent toward the front in a smooth curve to extend the front wheel out in front of the bicycle. After bending, the long fork is the equivalent of a twenty inch fork. Twenty inch wheels are used on both the front and the rear. The fork is bent into a smooth curve having about a six inch bending radius that stops short of being a ninety degree bend. The bend is on the order of 75 degrees, and may fall in the range of about 70 degrees to about 80 degrees. At the end of the smooth curve, the fork continues as a straight, non-curved extension to the distal end of the fork.

The rigid fork comprises a steer tube, a crown affixed to the steer tube, and furcations affixed to the crown. The furcations are provided with holes or slots at the distal ends for mounting the front wheel. When the rigid fork is bent as described above, the effect is to move the holes or slots forward of the extended centerline of the steer tube, while maintaining the holes or slots at the proper height above the ground to accommodate a twenty inch wheel. This geometry causes the distal ends of the furcations to be located five to ten inches from the extended centerline of the steer tube as measured along a line perpendicular to the centerline of the steer tube. Proportionally, this location is a point having a generally horizontal dimension measured from the axle slot along a perpendicular to the steer tube centerline that is greater than 60 percent of a generally vertical dimension from the bottom of the crown to the perpendicular that extends to the axle slot. Typically, it is around 80 or 90 percent, although it may be anywhere in the range of about 60 percent to about 100 percent.

When the rigid fork bent as described above is mounted to a standard bicycle frame having the steering column at about 75 degrees to the horizontal, the result is to cause the steer tube centerline to strike the ground behind the point where the front wheel touches the ground. This may be anywhere up to about six inches behind where the front wheel touches the ground. This geometry provides the low rider look but prevents the pedals from striking the ground.

In another aspect of the invention, a helical spring and struts are attached to the rigid fork near the steer tube. This spring simulates the appearance of a spring-action low rider fork, but since it is rigid, it does not affect the riding qualities of the low rider bicycle. In addition, the lower ends of the sissy bar are bent approximately ninety degrees toward the rear of the bicycle to simulate the appearance of twin chrome exhaust pipes.

Other features of the present invention are disclosed or apparent in the section entitled "Background of the Invention".

BRIEF DESCRIPTION OF DRAWINGS

In the detailed description of the preferred embodiments of the invention hereinafter presented, reference is made to the accompanying drawings, in which.

Figure 1:
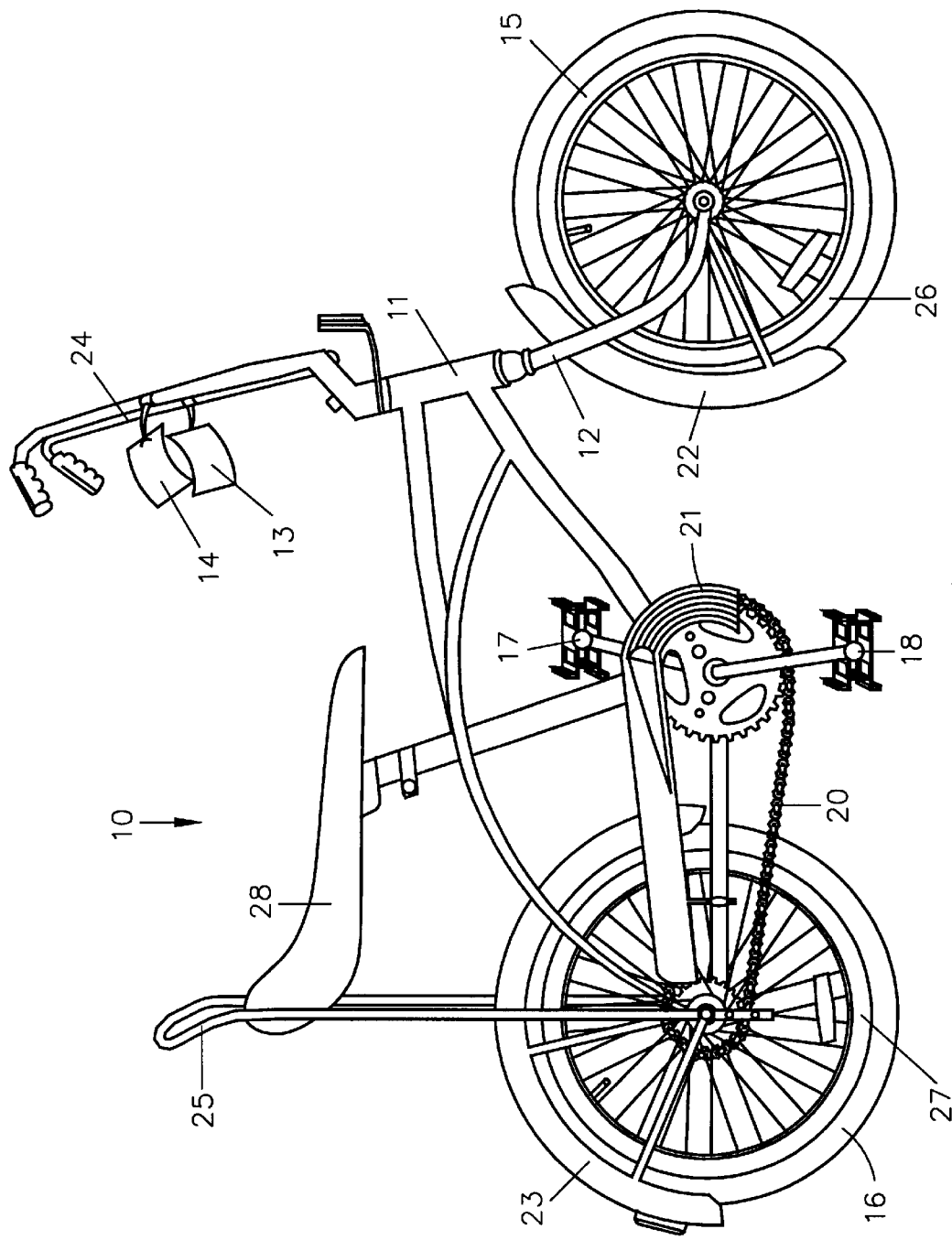
FIG. 1 is a side elevation view of a bicycle incorporating the low rider kit of the present invention.

Reference numbers refer to the same or equivalent parts of the invention throughout the several figures of the drawing.

Reference numbers refer to the same or equivalent parts of the present invention throughout the several figures of the drawing:

DESCRIPTION OF THE PREFERRED EMBODIMENTS

Figure 2:
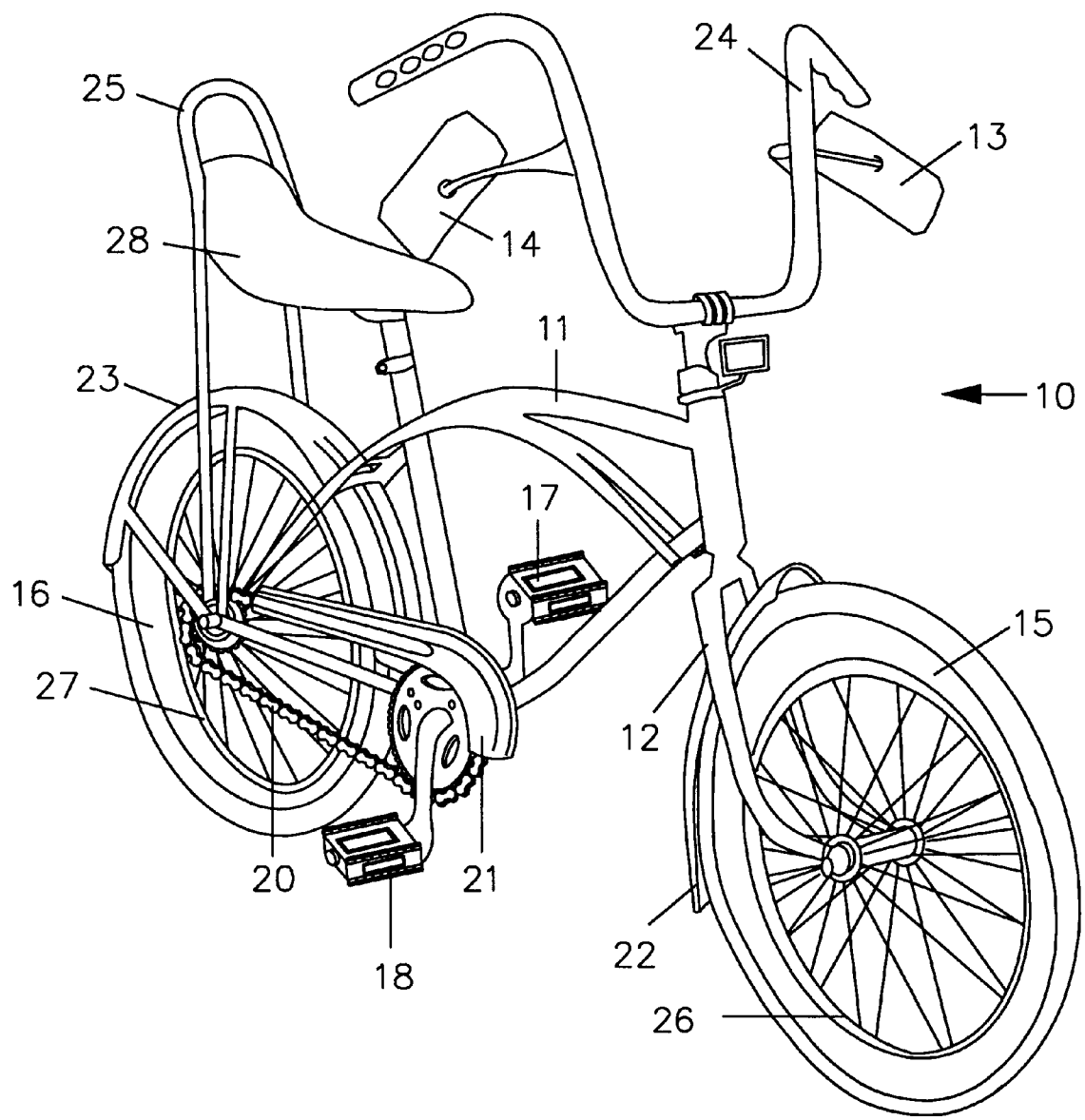
FIG. 2 is a perspective view of the bicycle shown in FIG. 1.

Referring now to FIGS. 1 and 2 of the drawings, there is shown a bicycle 10 incorporating a low rider kit in accordance with the present invention. FIG. 1 is a side view of the bicycle 10, while FIG. 2 is a perspective view. The bicycle 10 includes a cantilever frame 11, a specially bent rigid fork 12, left and right chrome mirrors 13, 14, front and rear white-wall tires 15, 16, left and right chrome pedals 17, 18, a chrome chain 20, a chrome chainguard 21, front and rear chrome fenders 22, 23, a high-rise handlebar assembly 24, a chrome "sissy bar" 25, front and rear chrome wheels 26, 27, and a banana seat 28.

Figure 3:
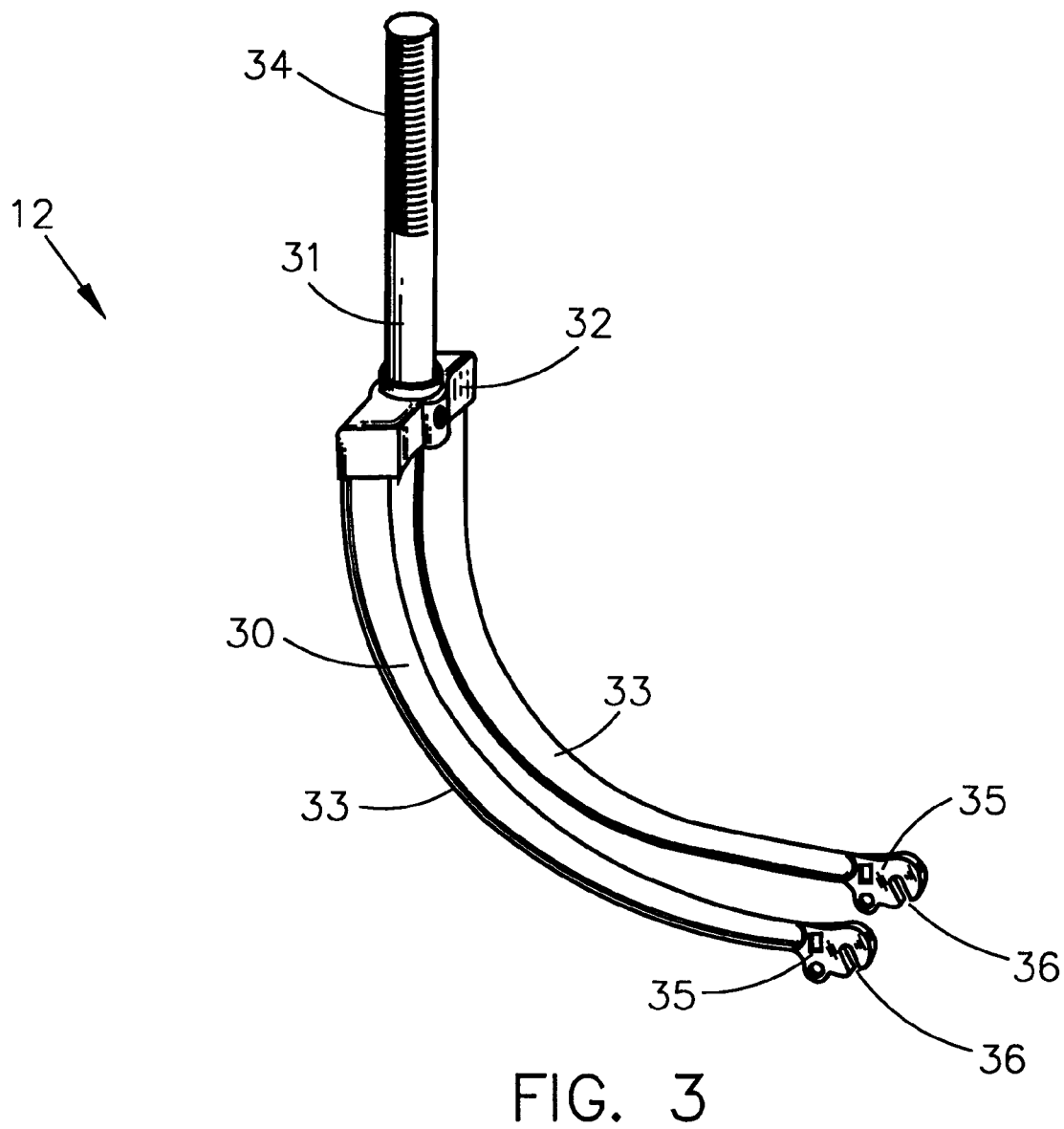
FIG. 3 is a perspective view of one embodiment of a rigid low rider fork made in accordance with the principles of the present invention.

Referring now to FIG. 3, there is shown a perspective view of the rigid bicycle fork 12. The rigid fork 12 is made of chrome plated steel, and comprises a steer tube 31, a crown 32, and two arms or furcations 33. The steer tube 31 is approximately eight inches long and one inch in diameter, and is provided with external threads 34 along the upper half thereof. The steer tube 31, crown 32, and furcations 33 are joined together into an integral structure, as by welding. The furcations 33, are approximately sixteen inches long, of a generally tubular shape having a tapering thickness toward the distal end. The furcations 33 are provided with flattened fastening members or ears 35 at the distal end, and are provided with openings or slots 36 therein for fastening to the axle of the front wheel 26 (FIG. 1). The furcations 23 are not absolutely straight prior to bending, but the fork 12 has a slight rake near the distal end.

Figure 4:
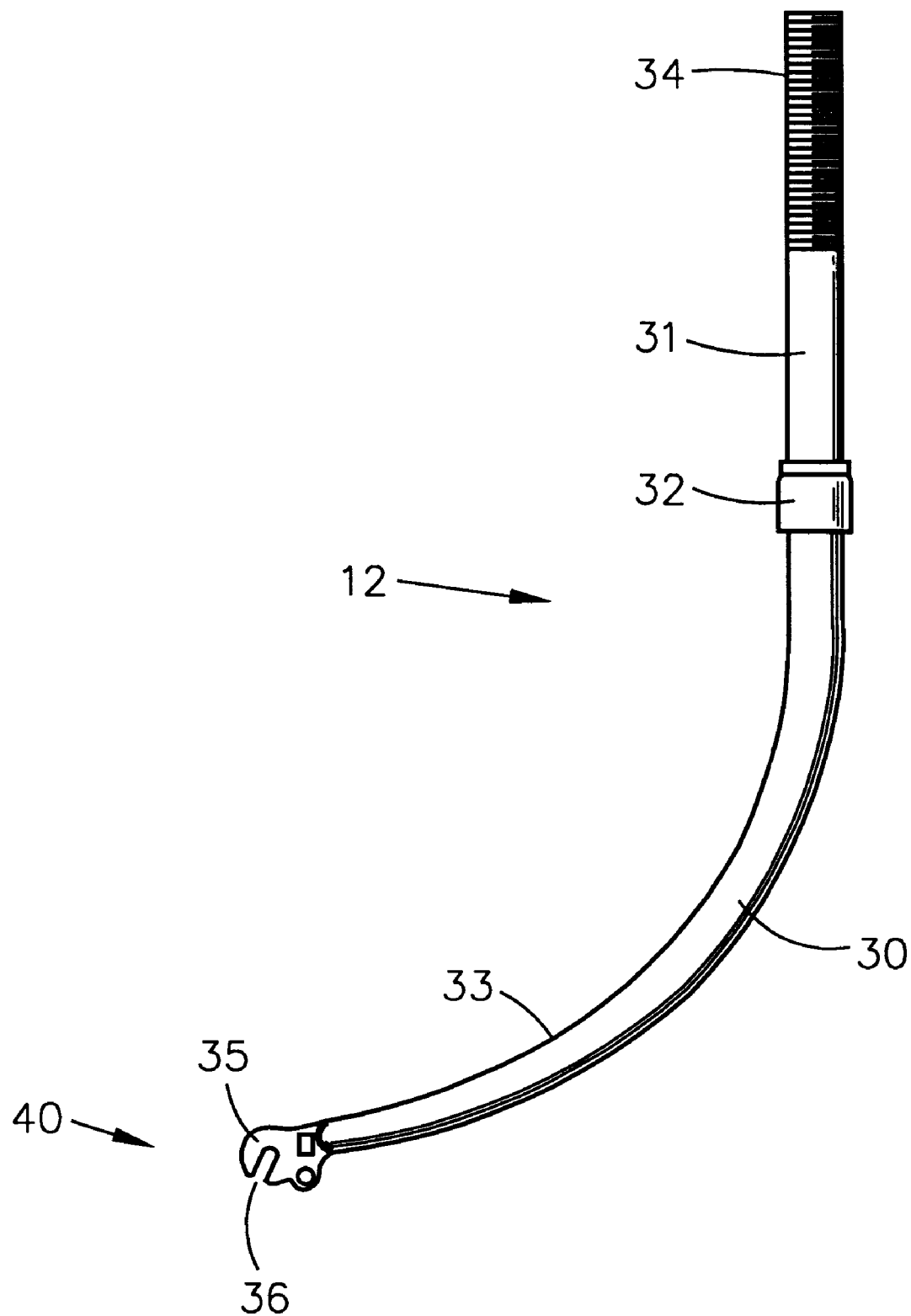
FIG. 4 is a side elevation view of the rigid fork shown in FIG. 3.

Referring now to FIG. 4 of the drawings, there is shown a side elevation view of the embodiment of the rigid fork 12 shown in FIG. 3. Size of the rigid fork 12 is measured from the crown 32 to the slot 36 of the axle unit. The present invention employs a long fork (27 inch or 700 C in metric) in combination with 20 inch wheels 26, 27. After bending, the long fork 12 is the equivalent of a 20 inch fork. The placement of the bend or curved portion 30 is important. The bending is done near the place where there already exists a bend, and where the wall thickness is suitable.

The rigid fork 12 is made stronger than stock bicycle forks. In accordance with the present invention, the rigid fork 12 may be made of chrome molybdenum steel, known as chrome moly. However, if it is desired to hold costs down, the rigid fork 12 may be made of a heavier gauge of high tensile strength steel instead. Doubling the wall thickness of the tubing of which the rigid fork 12 is made doubles the strength of the fork 12. A fork 12 made of chrome moly steel should have a wall thickness of approximately 1.2 mm, while a fork 12 made of high tensile strength steel should have a wall thickness of 2.4 mm. Only high tensile strength steel that passes Federal Guidelines is used. Because the rigid fork 12 of the present invention is made stronger than stock bicycle forks, there is no need for reinforcement struts to support the forward curvature.

It is contemplated that the bending will be done with professional assembly line tooling in a factory. Since the fork 12 is already chrome plated, steps will need to be taken to protect the plating during the bending operation. The bending process or method involves the following steps: first, the steer tube 31 is held rigid. Then, pressure is applied to the furcations 33 to bend them around a mandrel having a bending radius of about six inches. The pressure is continued until the furcations 33 come in contact with a preset stop. Due to the elasticity of the metal, the fork 12 springs back after bending. Thus, the fork 12 needs to be overbent slightly to compensate for the springback. The amount of overbend needed to compensate for the springback is easily determined empirically. After bending, there remains an end portion of the fork 12 that is a straight, non-curved extension continuing to the distal end of the furcations 33.

It has been found that if a specimen fork 12 needs to be bent by hand, this may be done by using a standard conduit bender of the right size, and modifying it slightly to accept the fork 12.

The rigid fork 12 of the present invention is bent in the generally lower portion above the dropout. The rigid fork 12 is bent in a smooth curve having about a six inch bending radius that stops short of being a ninety degree bend. The bend is on the order of 75 degrees, and may fall in the range of about 70 degrees to about 80 degrees. This bend results in a quality fork 12 that gives the illusion of a longer and lower, low-rider look. The bend does not, however, damage the structural integrity of the fork 12, or damage the chrome plating, or damage the steerability of the bicycle 10 after the fork 12 is installed. As indicated hereinabove, the rigid fork 12 terminates in a straight or tangential section that follows the curved section and extends to the distal end.

Figure 5:
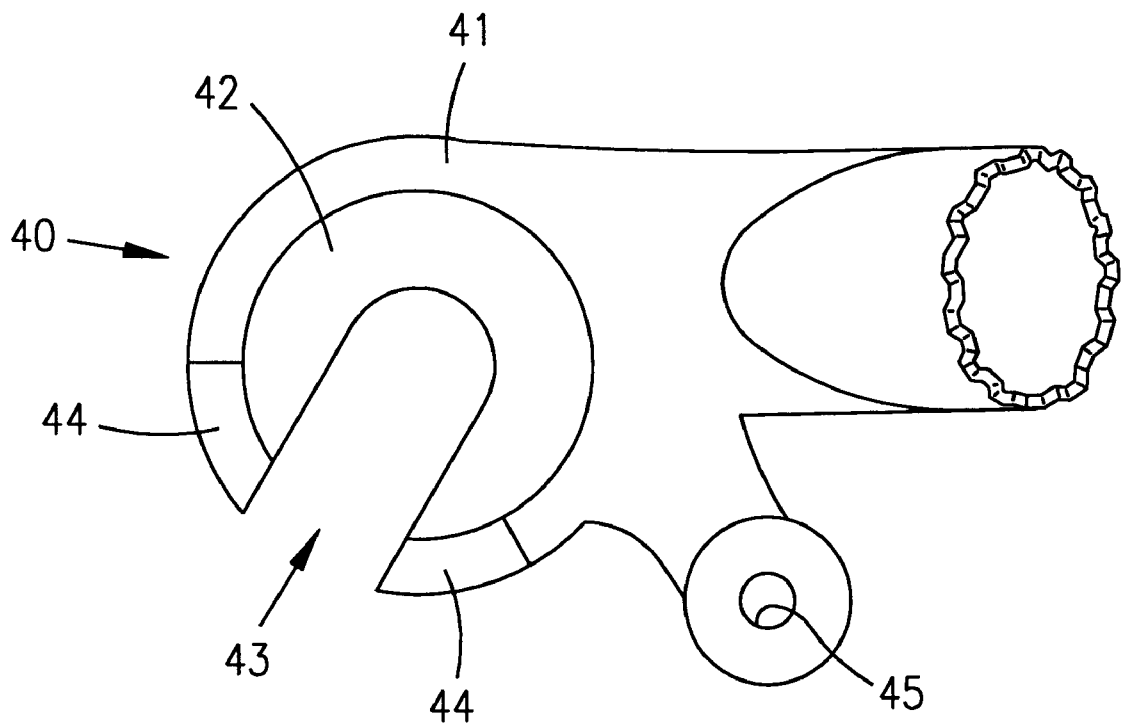
FIG. 5 is a side elevation view of a safety dropout for a low rider fork made in accordance with the principles of the present invention.

The fork 12 is provided with a safety feature known as a safety dropout 40. The dropout 40 is disposed at the distal end of the furcations 33, and may be either of tab tip design, or may be of the design known as the reversed dropout 40. Referring now to FIG. 5, there is shown a safety dropout 40. In accordance with the present invention, a redundant safety feature is built into the dropout 40. The typical stock dropout includes a washer that is usually thrown away by the bicycle owner. In the dropout 40 of the present invention, the washer is built into the fork so that it cannot be thrown away. In FIG. 5, the dropout 40 comprises a member 41 having a flat surface, on top of which is a raised generally circular washer portion 42 made integral therewith. A slot 43 to receive the axle (not shown) of the bicycle wheel passes through both the member 41 and the washer portion 42. The dropout 40 is provided with raised lips 44 to retain the nut (not shown). The dropout 40 also includes a threaded eyelet 45.

The steer tube 31 mounts to the frame 11 of the bicycle 10 by means of the threads 34. The hub or axle of the front wheel 26 mounts to the openings or slots 36 in the flattened fastening members or ears 35 at the distal end of the rigid fork 12. The bent long fork 12 becomes the equivalent of a twenty inch fork and is used with twenty inch wheels 26, 27. The frame 11 and pedals 17, 18 of the bicycle 10 have the same ground clearance as before. It will then be found that the bicycle 10 has been converted to a low rider, in that the front wheel 26 now extends forward in front of the bicycle 10, and the bicycle 10 will give the illusion of being longer and lower.

Figure 6:
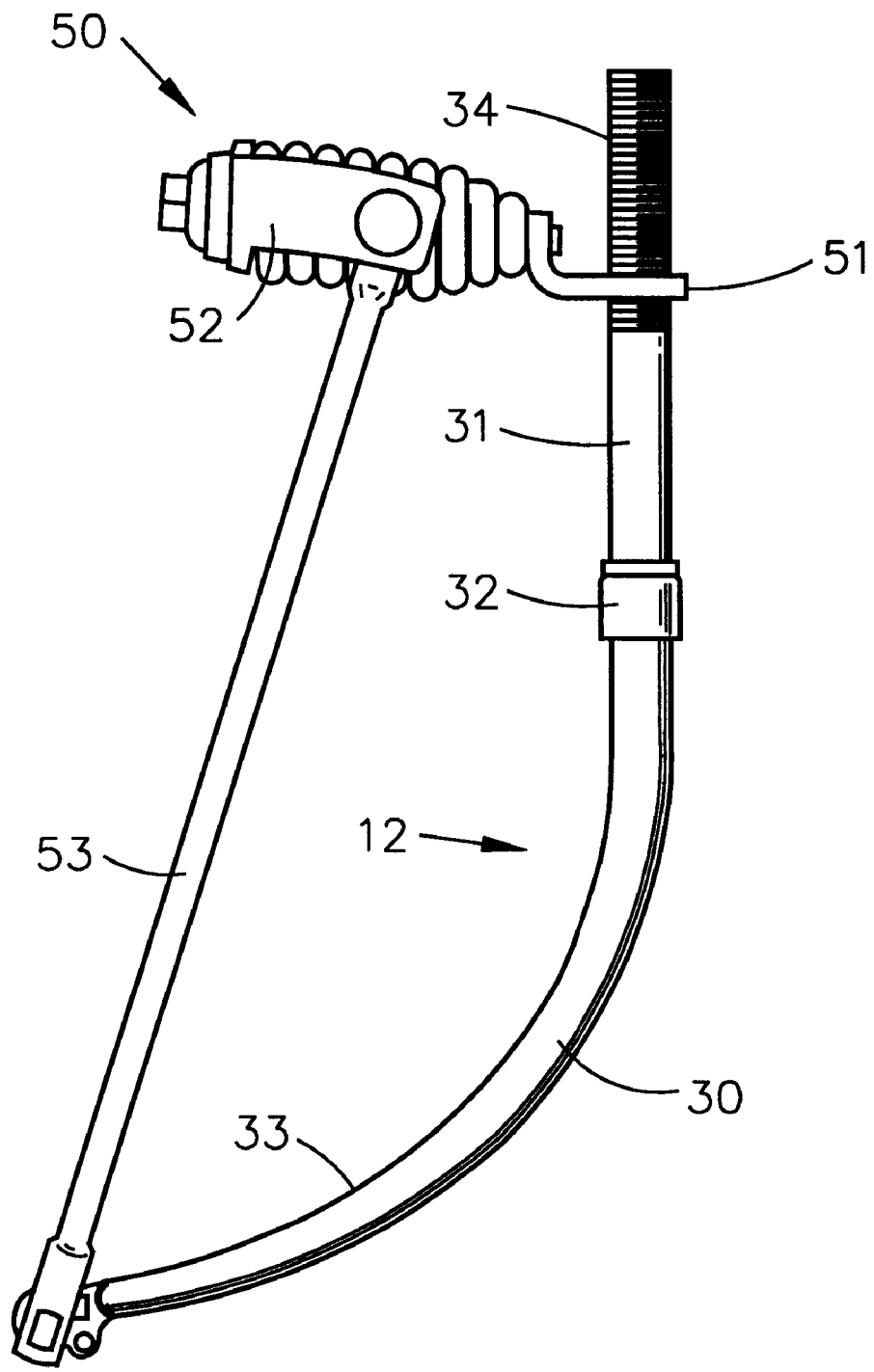
FIG. 6 is a side elevation view of a second embodiment of a rigid low rider fork made in accordance with the principles of the present invention.

FIG. 6 is a side elevation view of a second embodiment of the rigid fork 12 of FIG. 4. In FIG. 6, the fork 12 is provided with a helical- spring assembly 50 including an L-shaped member 51 having a hole through which passes the steer tube 31. The spring assembly 50 has a yoke 52 that is fastened to struts 53 that extend to the distal end of the rigid fork 12. It will be seen that the embodiment of FIG. 6 emulates a spring-action low rider fork without providing spring action.

Figure 7:
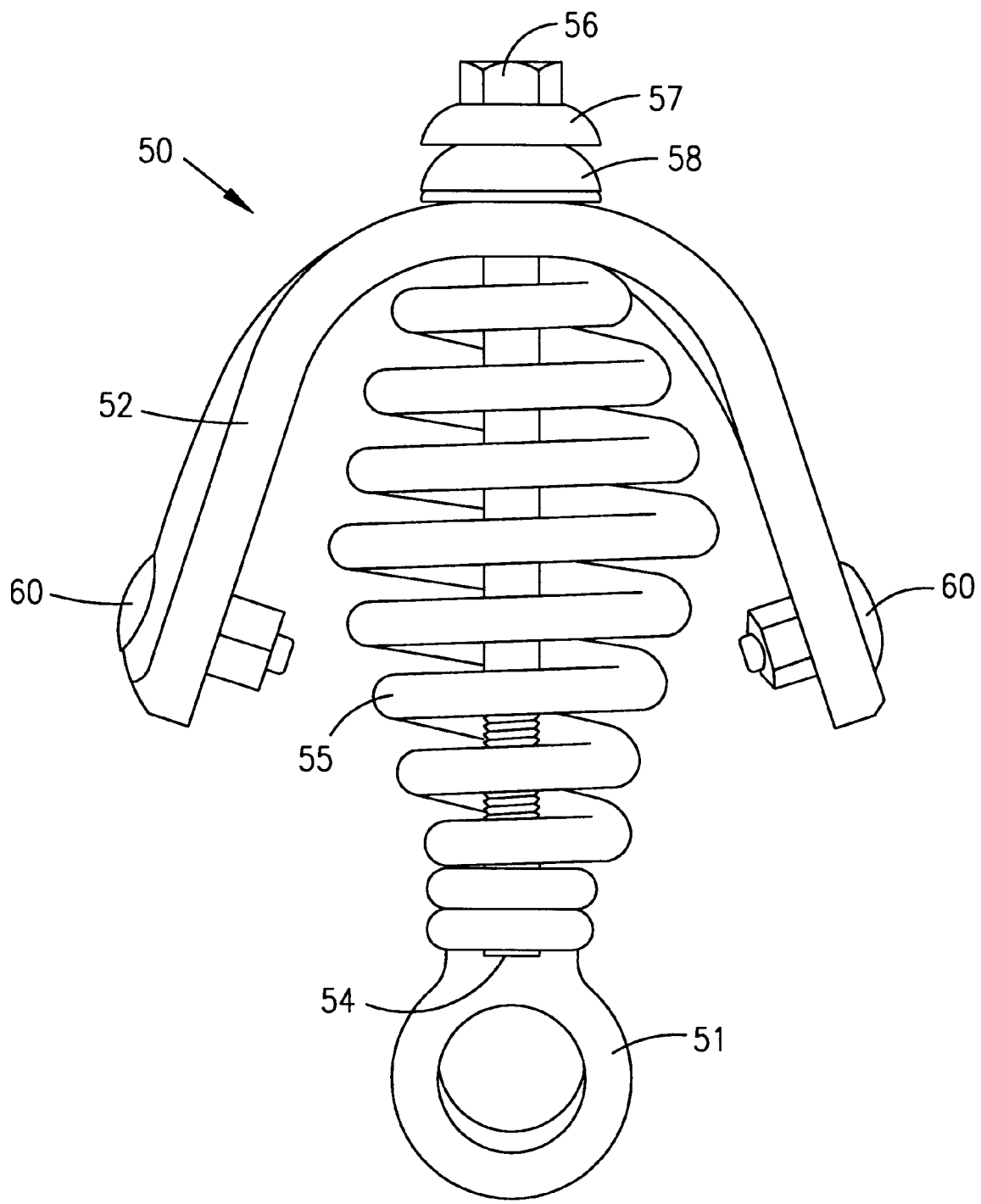
FIG. 7 is a top plan view of a helical spring assembly illustrated in FIG. 6.

FIG. 7 shows a top plan view of the helical spring assembly 50 illustrated in FIG. 6. The L-shaped member 51 has a threaded hole to receive the end of a long cap screw 54. The screw 54 extends through the center of a helical spring 55. The screw 54 has a head 56 disposed adjacent a metal washer 57 that compresses a flexible, annular member 58 against the yoke 52. The distal ends of the yoke 52 are provided with fasteners 60 to secure the ends of the struts 53 seen in FIG. 6.

The spring assembly 50 is substantially the same as that disclosed in U.S. Pat. No. 2,160,034 issued May 30, 1939, to Frank W. Schwinn. In the present application, the rigid fork 12 is not pivoted and does not compress the helical spring 55. Accordingly, the spring assembly 50 of the present invention does not provide a cushioning action. Thus, the rigid fork 12 of the present invention provides the appearance of a "springer fork" without providing spring action that adversely affects the riding qualities of the low rider bicycle.

Figure 8:
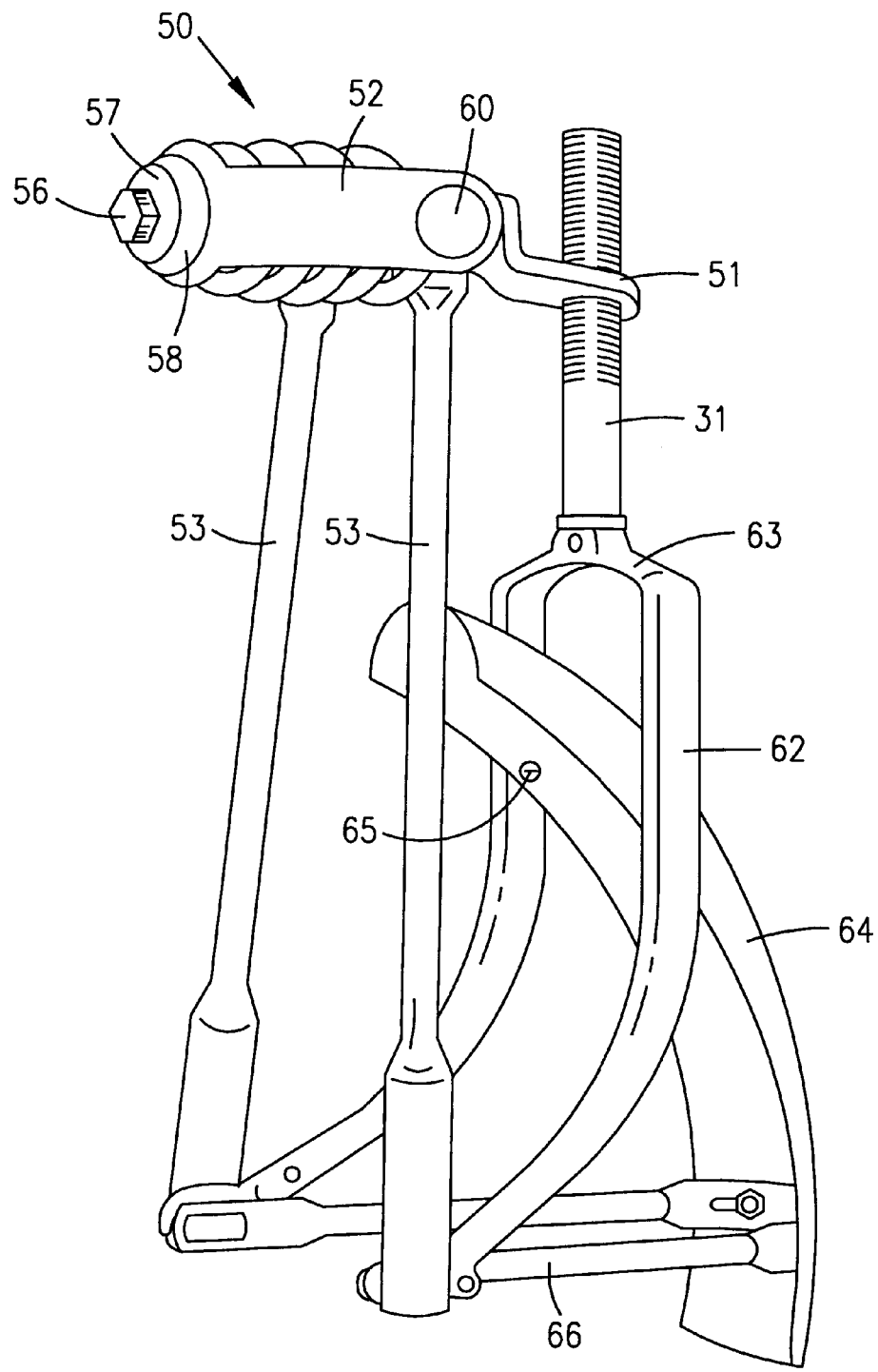
FIG. 8 is a perspective view of one style of a rigid fork having a generally sloping crown, and showing a front fender attached thereto.

FIG. 8 is a perspective view of a first style of rigid fork 62 having a generally sloping crown 63. FIG. 8 also shows a front fender 64 mounted to the fork 62 by screws 65, and a bent strut 66.

Figure 9:
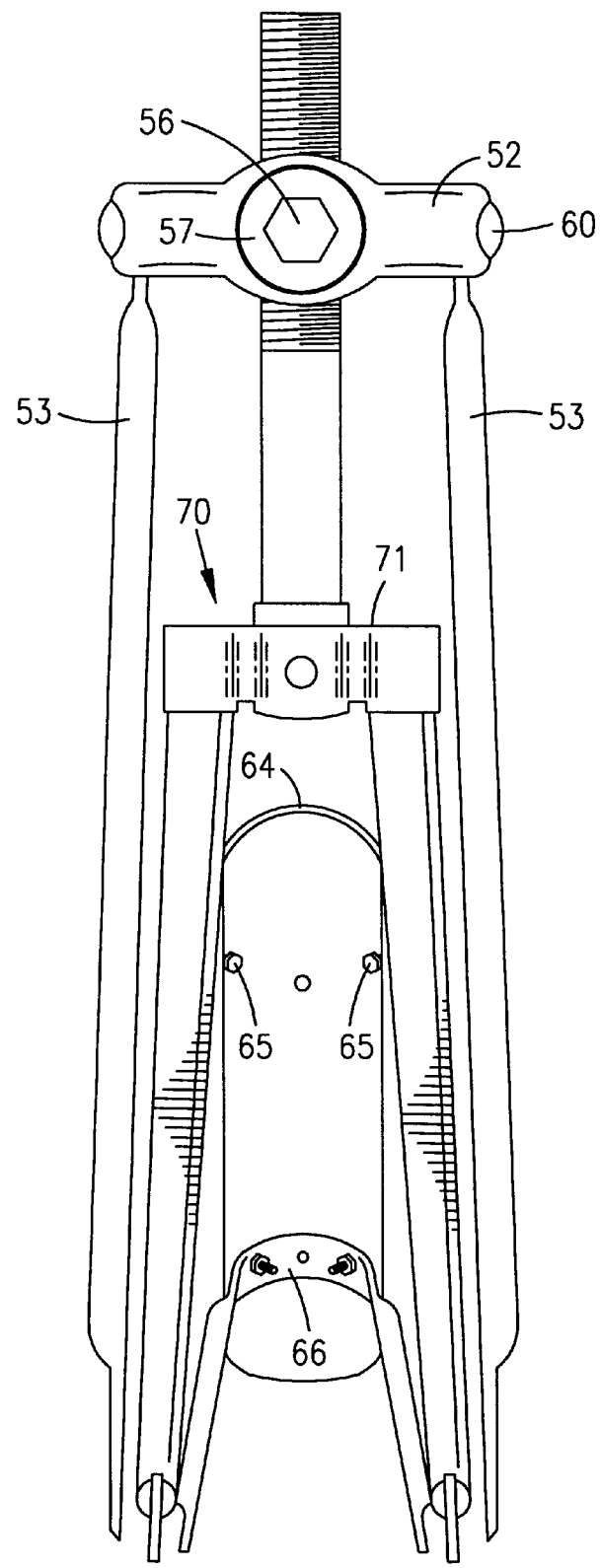
FIG. 9 is a front elevation view of a different style of rigid fork having a generally rectangular crown.

FIG. 9 is a front elevation view of a different style of rigid fork 70 having a generally rectangular crown 71. FIG. 9 provides a good illustration of the screw 65 and bent strut 66 used for mounting the fender 64 to the fork 70.

Figure 10:
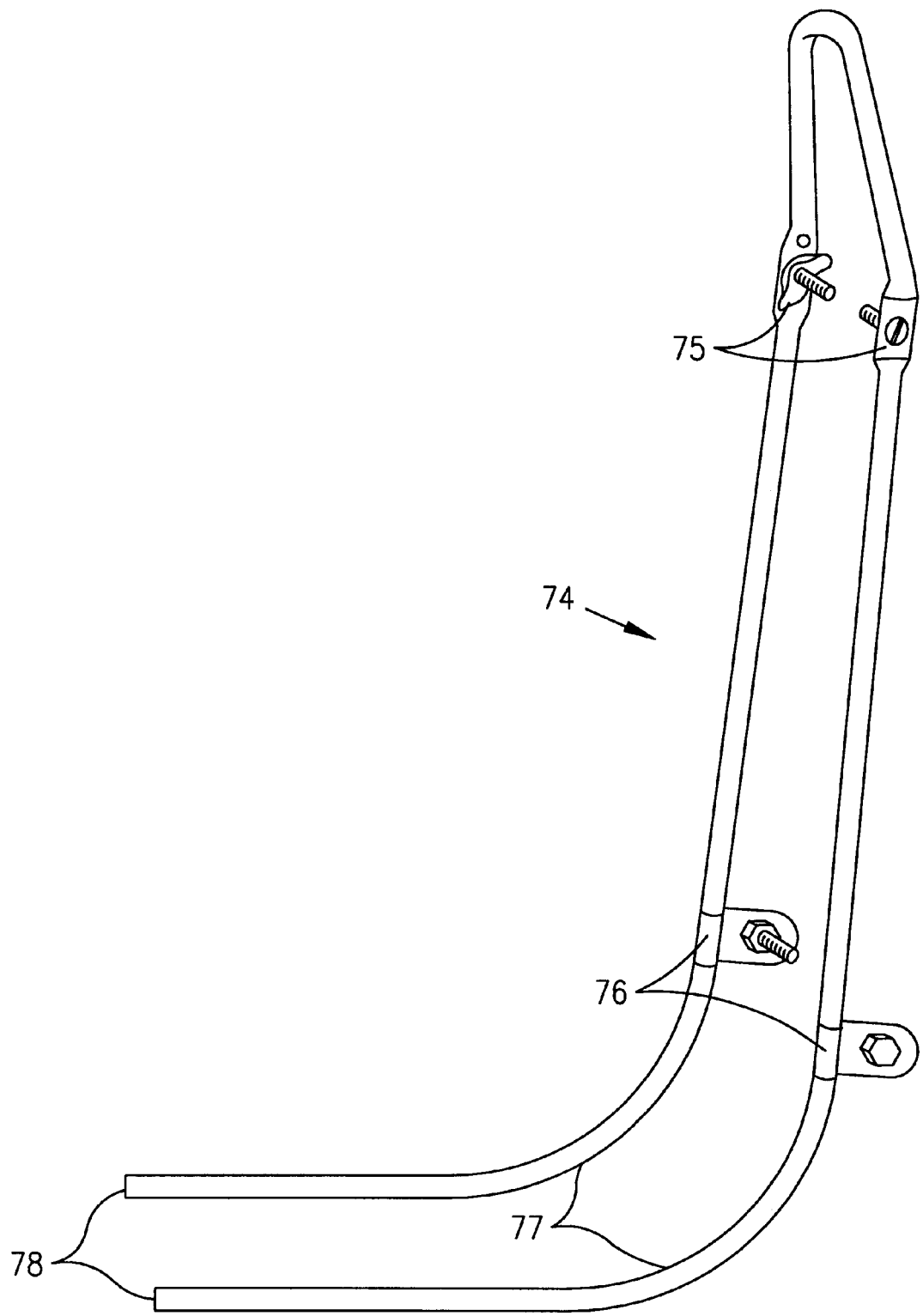
FIG. 10 is a perspective view of a sissy bar having a near right angle bend for simulating twin tail pipes.

FIG. 10 is a perspective view of a sissy bar 74. The sissy bar 74 is provided with fasteners 75, 76 for mounting to the low rider bicycle. It is a feature of the present invention that the sissy bar 74 is extra long, and is provided with a near ninety degree bend 77. This results in the ends of the sissy bar 74 extending from the rear of the low rider bicycle as simulated twin tail pipes 78.

Figure 11:
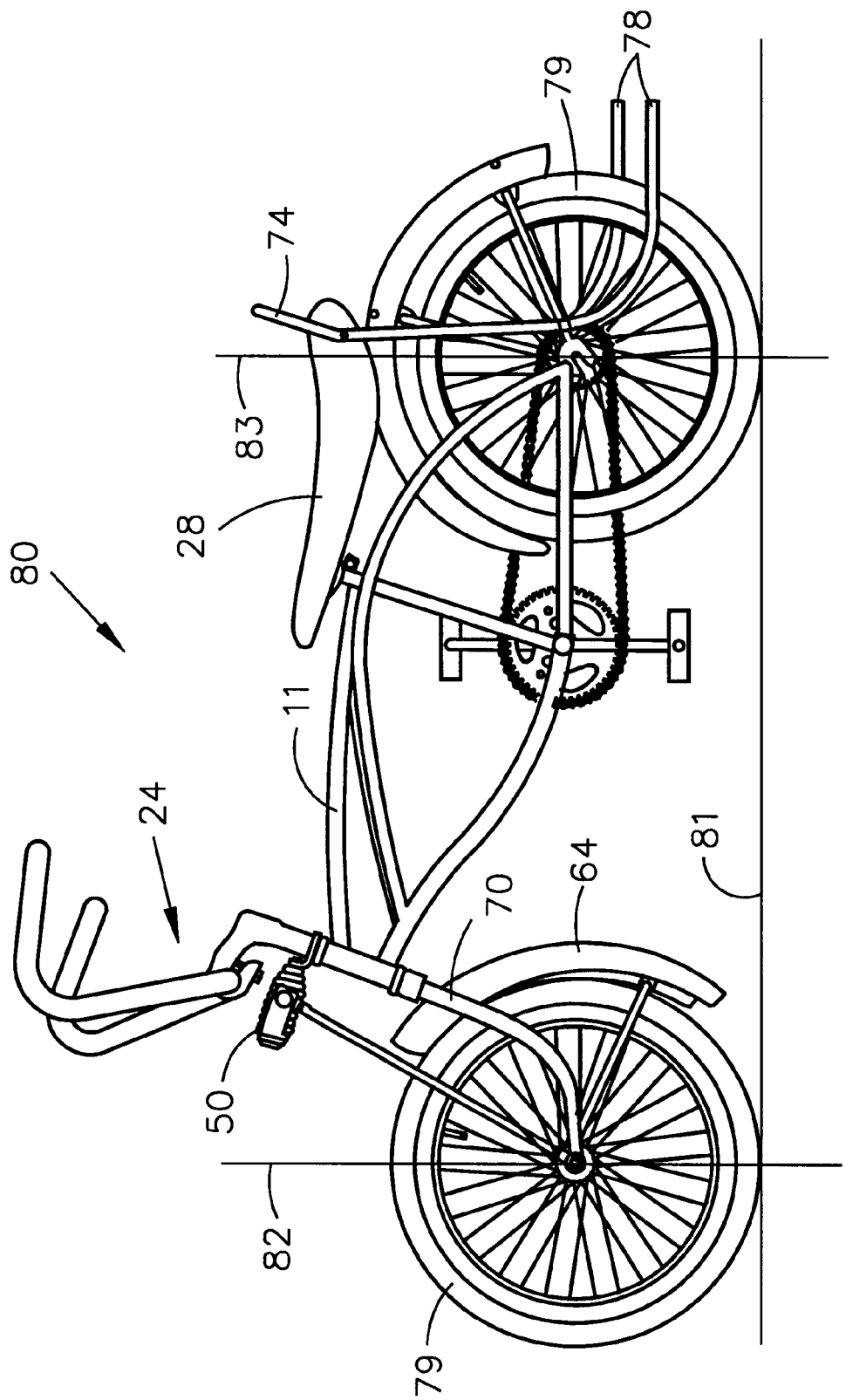
FIG. 11 is a side elevation view of a low rider bicycle in accordance with the principles of the present invention.

FIG. 11 is a side elevation view of a low rider bicycle 80 in accordance with the principles of the present invention. The bicycle 80 is provided with twenty inch wheels 79. A horizontal line 81 represents the ground, and two vertical lines 82, 83 pass through the axles of the wheels 79 and indicate the point of contact with the ground. The bicycle 80 is provided with the bent rigid fork 70, the helical spring assembly 50, the front fender 64, and the sissy bar 74 having the simulated twin tail pipes 78. Also, the bicycle 80 employs the high rise handlebar assembly 24, and the banana seat 28 described heretofore in connection with FIG. 1.

Figure 12:
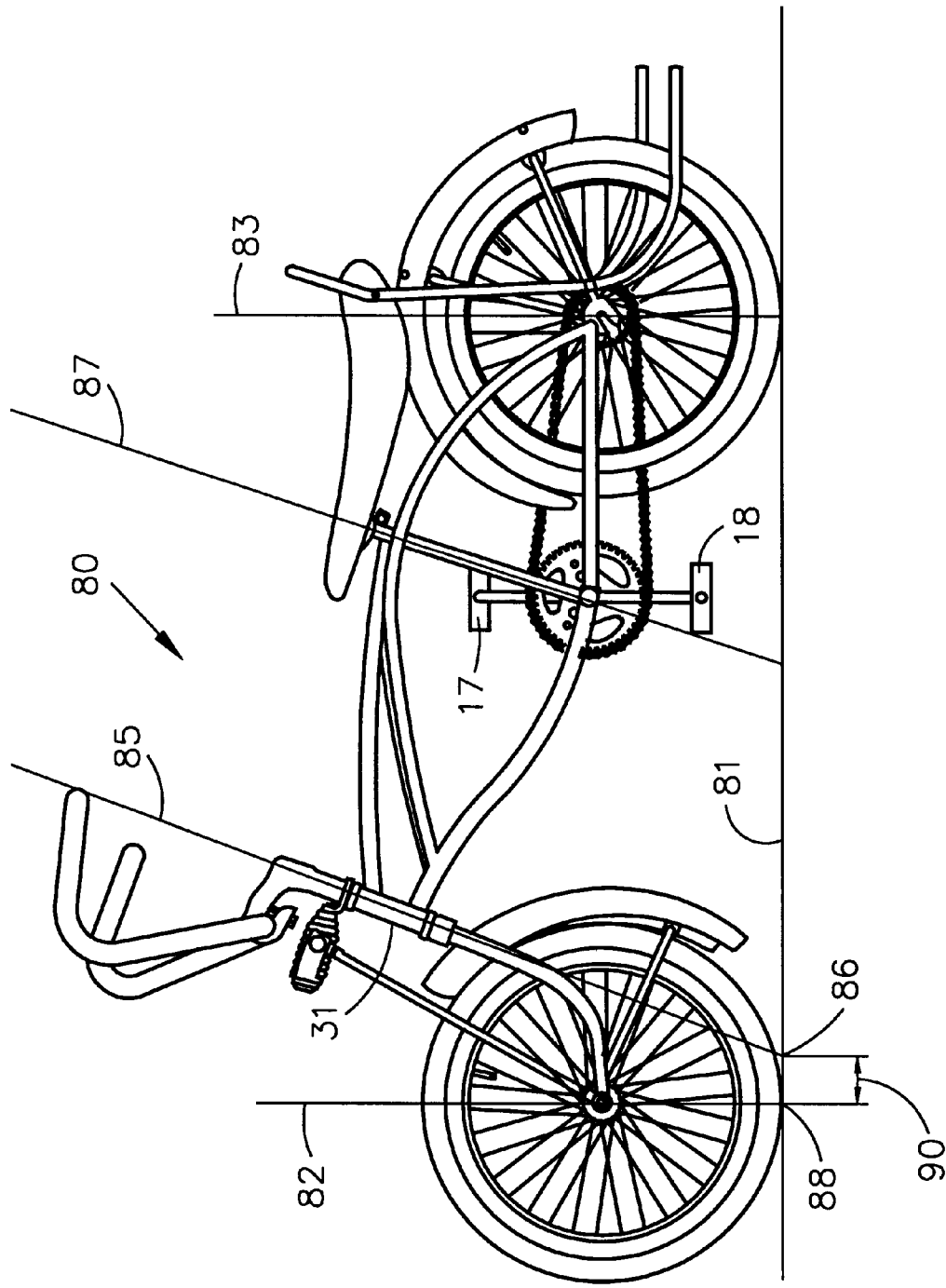
FIG. 12 is a side elevation view of the bicycle of FIG. 11, showing where a line through the steer tube intersects the ground.

FIG. 12 is similar to FIG. 11, except that FIG. 12 shows a line 85 extending through the steer tube 31, and intersecting the ground line 81 at a point 86 behind the front axle line 82. FIG. 12 also shows a line 87 extending through the seat post line. Similarly to the arrangement described in connection with FIG. 1, the fork 70 is mounted to a standard frame 11 having the steering column at about 75 degrees to the horizontal. The centerline of the steer tube 31 when extended strikes the ground behind a point 88 where the front wheel 79 touches the ground. This dimension, illustrated by a double-headed arrow 90, may be anywhere up to about six inches behind where the front wheel 79 touches the ground. This geometry provides the low rider look but prevents the pedals 17, 18 from striking the ground.

Figure 13:
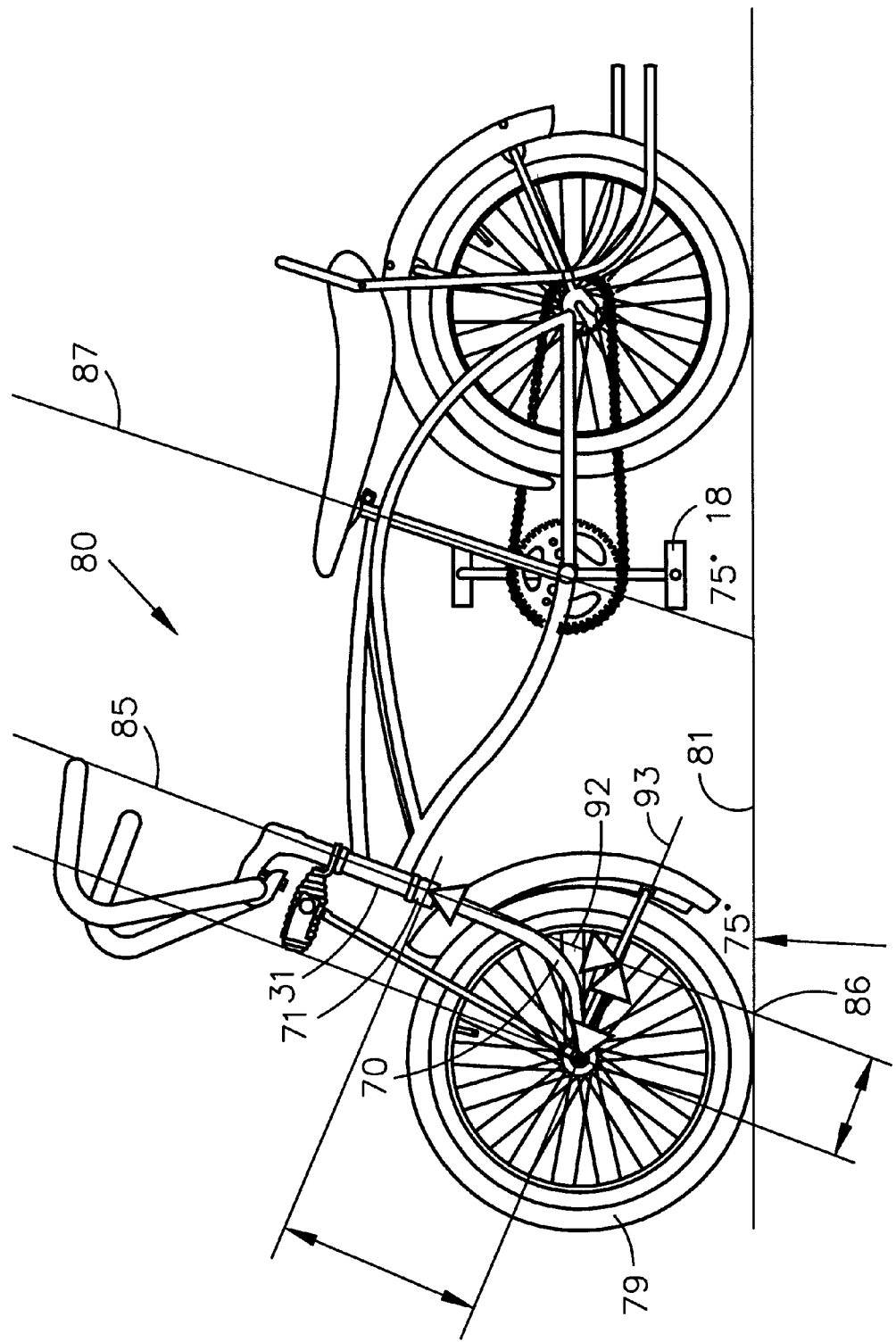
FIG. 13 is a side elevation view of the bicycle of FIGS. 11 and 12, showing the proportionality of the bend in the rigid front fork.

FIG. 13 is similar to FIGS. 11 and 12, except that FIG. 13 illustrates the proportionality of the bent rigid front fork 70. As was indicated hereinbefore, the rigid fork 70 is bent in a smooth curve having about a six inch bending radius that stops short of being a ninety degree bend. The bend is on the order of 75 degrees, and may fall in the range of about 70 degrees to about 80 degrees. The front wheel 79 extends forward about five to ten inches from the extended centerline 85 of the steer tube 31. This is illustrated in FIG. 13 by a double-headed arrow 91 that extends along a line perpendicular to the centerline 85 of the steer tube 31.

The axle end of the rigid fork 70 is thus displaced to a position having a generally horizontal dimension indicated by arrow 91. This generally horizontal dimension is measured along arrow 91 from the axle along a perpendicular to the centerline 85 of the steer tube 31. This generally horizontal dimension represented by arrow 91 is greater than 60 percent of a generally vertical dimension represented by a double-headed arrow 92 that extends from the bottom of the crown 71 to a perpendicular 93 that extends to the axle. Typically, it is around 80 or 90 percent, although it may be anywhere in the range of about 60 percent to about 100 percent.

Thus, there has been described a novel low rider kit for a bicycle including chrome mirrors, white-wall tires, chrome pedals, a chrome chain, a chrome chainguard, chrome fenders, high-rise handlebars, a chrome "sissy-bar", chrome wheels, a banana seat, and a specially bent rigid fork. It will be seen that the rigid fork has many advantages over the prior art. It is safe, it is less expensive, it is already chrome plated, it gives the illusion of a longer and lower appearance to the bicycle 10, and it extends the front wheel 25 out in front of the bicycle 10. Furthermore, the method of making the rigid fork of the present invention has also been disclosed.

The low rider kit of the present invention, including the specially bent rigid fork, provides many features and advantages that fill a long-felt need and that distinguish it over the prior art. The placement of the bend is at the point where a bend already exists, and where the wall thickness is suitable. No heat is used in making the bend. No kinks are produced by the bending. The rigid fork is made of higher strength material, and is made of a heavier wall thickness. The need for reinforcement struts to support the forward curvature is eliminated. The bending does not mar the chrome plating, does not damage the structural integrity, and does not adversely affect the steerability of the bicycle. A safety dropout is used that has a built in safety washer. This eliminates the need for a separate safety washer, and prevents the safety washer being thrown away. The safety dropout includes raised lips to retain the axle nut.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims. The inventions illustratively disclosed herein may be practiced without any element which is not specifically disclosed herein.

What is claimed is:

1. The equivalent of a 20 inch rigid bicycle fork engageable with a head tube of a bicycle having a cantilever frame, including a steering column of about 75 degrees to the horizontal, including pedals, comprising:

a steer tube defining an axis;

a 20 inch front wheel for rollably contacting the ground at a contact point;

a crown fixed to said steer tube;

tubular furcations fixed to said crown, said furcations having a wall thickness and having limbs, said furcations defining respective distal ends; and the fork has a smooth curve having about a six inch bending radius that stops short of being a 90 degree bend in the furcations, the bend being on the order of 75 degrees and may fall in the range of about 70 degrees to about 80 degrees, at the end of the smooth curve the fork continues as a straight, non-curved extension to the distal end of the fork, the result being to cause the steer tube centerline to strike the ground anywhere up to about six inches behind the point where the front wheel touches the ground.

2. The bicycle fork of claim 1, wherein said furcations extend in a forward direction in a range of five to ten inches beyond the axis of said steer tube without permitting the pedals to strike the ground when the bicycle fork is engaged with the head tube.

* * * * *